United States Patent [19]
Haslett

[11] 4,092,967
[45] June 6, 1978

[54] I.C. ENGINES
[75] Inventor: Robert Alan Haslett, Shoreham-by-Sea, England
[73] Assignee: Ricardo & Co., Engineers (1927) Limited, England
[21] Appl. No.: 730,071
[22] Filed: Oct. 6, 1976
[30] Foreign Application Priority Data
Jun. 10, 1976 United Kingdom ............... 24156/76
[51] Int. Cl.² ............................................. F02B 75/12
[52] U.S. Cl. ........................... 123/143 B; 123/191 A; 123/193 P
[58] Field of Search ........... 123/143 R, 143 B, 119 E, 123/193 CP, 193 P, 32 C, 191 A; 60/39.06, 39.69 A

[56] References Cited
U.S. PATENT DOCUMENTS

| | | | |
|---|---|---|---|
| 1,820,878 | 8/1931 | Wyckoff | 123/191 A |
| 1,926,499 | 9/1933 | Ricardo | 123/32 C |
| 2,978,360 | 4/1961 | Bradstreet et al. | 123/191 A |
| 3,444,098 | 5/1969 | Bottazi et al. | 123/191 A |
| 3,481,317 | 12/1969 | Hughes et al. | 123/143 R |
| 4,011,839 | 3/1977 | Pfefferle | 123/191 A X |

FOREIGN PATENT DOCUMENTS
414,398 7/1934 United Kingdom.

*Primary Examiner*—Charles J. Myhre
*Assistant Examiner*—Tony M. Argenbright
*Attorney, Agent, or Firm*—Cushman, Darby & Cushman

[57] ABSTRACT

An internal combustion engine of reciprocating-piston type with injection of liquid or gaseous hydrocarbon fuel, provided with catalytic means for initiating the combustion of the air/fuel charge in the combustion chamber of the or each cylinder. The major part of the combustion chamber of each cylinder is afforded by a recess formed in the piston crown, and a catalytic element of mesh, grid, perforated or sintered or other construction, is carried by the piston in a position at least partly overlying the said recess, the fuel being injected into the said recess to contact and pass through the catalytic element, being ignited by its contact with the catalytic element.

14 Claims, 5 Drawing Figures

I.C. ENGINES

BACKGROUND AND OBJECTS OF THE INVENTION

This invention relates to internal combustion engines of the reciprocating-piston kind, utilising liquid or gaseous hydrocarbons fuel. The invention, which concerns the ignition of the air/fuel mixture in the combustion chamber of the engine, is particularly, although not exclusively, applicable to reciprocating-piston petrol and diesel engines although it may also be applied to engines utilizing other forms of liquid fuel such as methyl or ethyl alcohols and even gaseous fuels.

With the rising number of road vehicles with i.c. engines in regular use, particularly in urban areas, problems of air pollution have become acute, particularly in certain places having long periods of sunshine, due to photo-chemical reactions between the atmosphere and the exhaust emission of such vehicle engines. This effect manifests itself as "smog" due to complexes of nitrogen oxides, giving rise to reduced visibility and irritation of the eyes, nose and throat. This had led to the introduction of legislation in at least one country to limit locally the quantities of unburnt hydrocarbon, carbon monoxide and nitrogen oxides present in the exhaust emissions of all road vehicle engines. This legal limitation has hardened progressively with time, to an extent which poses considerable technical difficulties to vehicle and engine manufacturers.

One approach to the problem of reducing undesirable exhaust emission is to operate engines with as weak a mixture strength as possible, i.e. as high an air/fuel ratio as is practicable, giving a marked reduction in $NO_x$ emission with increases in air/fuel ratio but with an increase in HC at high air/fuel ratios. $NO_x$ is formed at high combustion temperatures and once formed remains very stable. However with high air/fuel ratios the rate of combustion reaction is slowed down and less heat is released from the smaller quantity of fuel used, so that the temperature rise of the whole air/fuel mass is less than with stoichiometric mixtures. On the other hand the actual burning efficiency of the hydrocarbon fuel is lowered at high air/fuel ratios due to its greater diffusion into the air present, so that although it is possible to ignite the fuel locally by an intense spark at weak mixtures, the flame often fails to reach all the fuel present and as a result some unburnt hydrocarbons remain in the exhaust gases.

Numerous attempts have been made to overcome this by designing so-called "stratified charge" petrol engines in which the fuel is concentrated in a locally-rich portion of charge in proximity to the spark plug or ignition point, and this rich mixture burns rapidly on ignition before being dispersed into the remainder of the charge which may consist of air only. Whilst some reduction in unburnt hydrocarbon levels in the exhaust emissions has been obtained with this approach, there is still ample room for improvement.

At present, the only two methods of igniting the air/fuel mixture in an i.c. piston engine employed in practice are spark ignition and compression ignition, each of which relies on the spread of combustion by a flame front throughout the whole of the mixture charge.

An object of the invention is to provide a new and different way of catalytically igniting the charge in an i.c. piston engine, which does not rely on a flame front to spread the combustion throughout the charge, and which will enable very weak mixtures to be utilized which are not burnable by ordinary spark ignition or compression ignition means.

It has been proposed to utilise a catalyst member mounted in the combustion chamber of the or each cylinder of a piston engine to ignite the air/fuel charge and so initiate the combustion. The catalyst member in this proposal takes the form of a relatively thick disc of honeycomb structure fixedly mounted in the cylinder to extend completely across the cylinder bore above the top-dead-centre position of the piston and below the cylinder head, the fuel introduced into the combustion chamber contacting the catalyst and mixing with the air compressed in the cylinder during the preceding compression stroke, so that the air/fuel mixture is ignited by the catalyst and passes through the catalytic disc to complete the combustion.

With such an arrangement, however, the presence of the relatively thick catalyst member in the cylinder bore between the piston crown and the cylinder head is likely, in a practical design of engine, to impose a serious restriction on the possible value of the compression ratio, if mechanical interference is to be avoided. A low compression ratio leads to unacceptably low thermal efficiency and fuel economy. Moreover, since the effect of the use of the catalyst for ignition is to permit oxidation of the fuel, i.e. combustion, at weaker mixture strengths than can be used with conventional forms of ignition, it would be desirable to take advantage of this to utilise higher than normal compression ratios without "knock" in conjunction with air/fuel mixtures specifically weaker than that for stoichiometric mixture strength.

BRIEF SUMMARY OF THE INVENTION

According to the parent invention, an internal combustion engine of reciprocating-piston type has in each cylinder a combustion chamber the major portion of the volume of which, at the top-dead-centre position of the piston, is afforded by a recess formed in the upper surface of the piston crown, and is provided with a catalytic element carried by the piston and mounted in a position in which at least a part of the catalytic element overlies the said recess, and means is provided for injecting fuel into the recess when the piston is at about its top-dead-centre position and in a direction such that substantially the whole of the injected fuel will contact the surface of the catalytic element to initiate its combustion.

The catalytic element may for example be formed with multiple small apertures or passages extending through its thickness, through which the injected gaseous or atomised-liquid fuel will pass, and may extend completely across the open top of the recess. For example the element may be of a gauze, matrix or mesh structure, or may be a porous or perforated sheet or a sintered member.

By means of the invention the presence of unburnt hydrocarbons in the exhaust emission can be greatly reduced or even avoided altogether. At the end of the compression stroke or stage, the gas pressure and temperature and the amount of oxygen present are much more favourable for catalytic oxidation of the hydrocarbons than is the case in a catalyst box situated within the engine exhaust system as in known arrangements. Furthermore, stratification of the charge is not required because a homogeneous lean mixture of almost any air/fuel ratio can be oxidized catalytically by means of the invention. The engine load can be simply regulated by the amount of fuel supplied to the engine.

The invention can be utilized with engines employing methyl or ethyl alcohols, or even gaseous fuels, as well as with petrol and diesel engines, and is particularly advantageous if "wide-cut" fuels have to be used as may become increasingly necessary in the future.

In an example, the or each catalytic element may take the form of a basket structure associated with the combustion recess in the crown of the piston, the fuel being injected through a hole in the top wall of the basket into the interior of the recess so as to be carried through the wall of the basket structure by the movement of the combustion air.

The essential feature of the invention is the use of a catalyst mounted on the piston to overlie the combustion recess in the piston crown, to promote combustion of the fuel at widely-distributed points and at all mixture strengths. For this purpose it is necessary to utilize catalytic material in a structure which has a widely-distributed surface area into intimate contact with which all the fuel to be combusted in the cylinder must be brought so as to ensure multi-point oxidation of all the fuel before it reaches the exhaust. Thus the spread of a flame front is not relied upon to ensure complete combustion of all the fuel.

Catalytic oxidation of an air/fuel mixture may take place at temperatures considerably lower than in conventional flame propagation, and may also occur at air/fuel ratios considerably greater than are normally used in i.c. engines, and with correspondingly lower heat release and temperature rise.

The invention may be carried into practice in various ways, but one specific embodiment and certain modifications thereof will now be described by way of example only, and with reference to the accompanying drawings in which.

Figure 1:
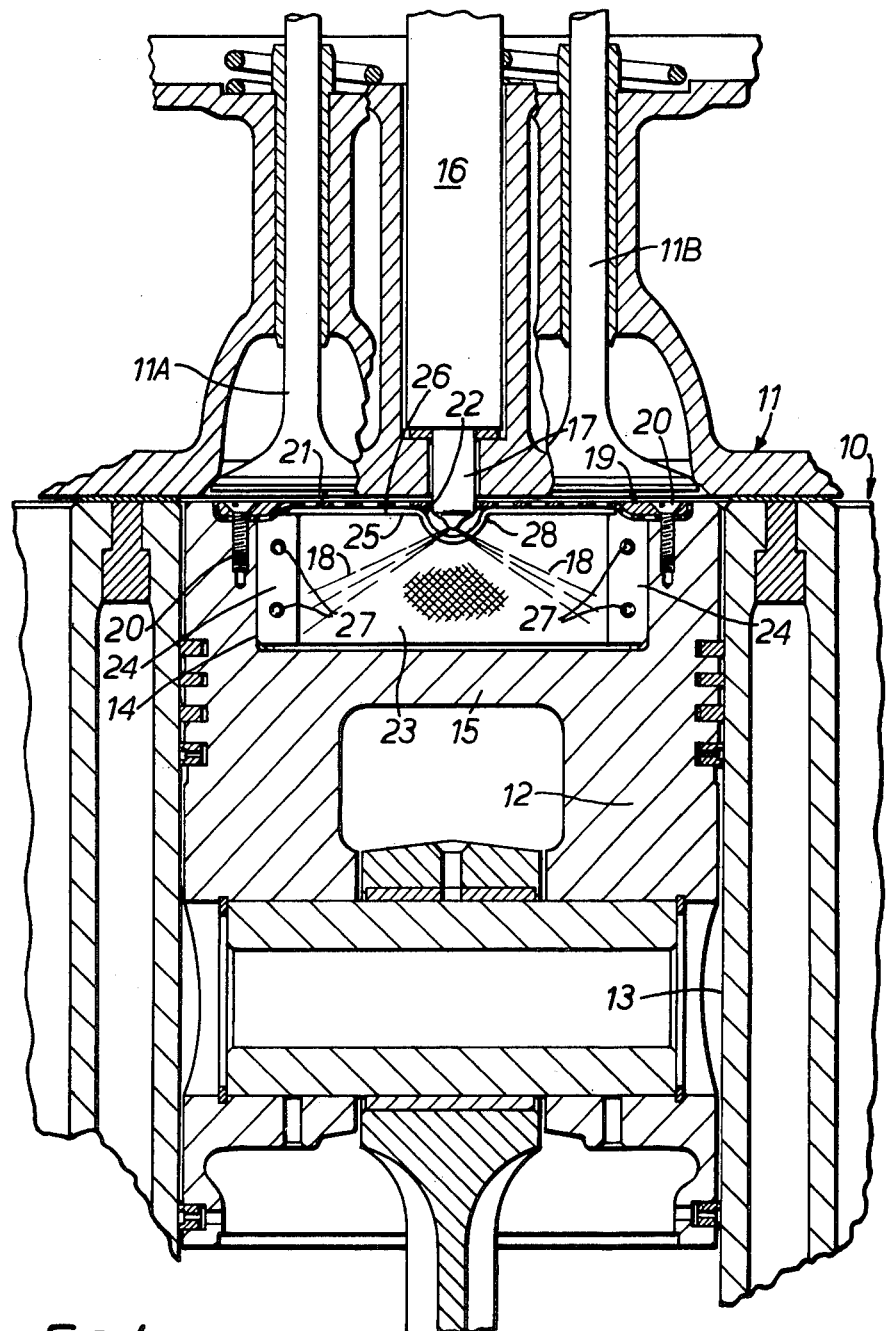
FIG. 1 is a sectional elevation of a typical cylinder arrangement in a gasoline engine of the fuel-injection kind, indicating the position of the fuel injection nozzle at top-dead-centre.
Figure 1A:
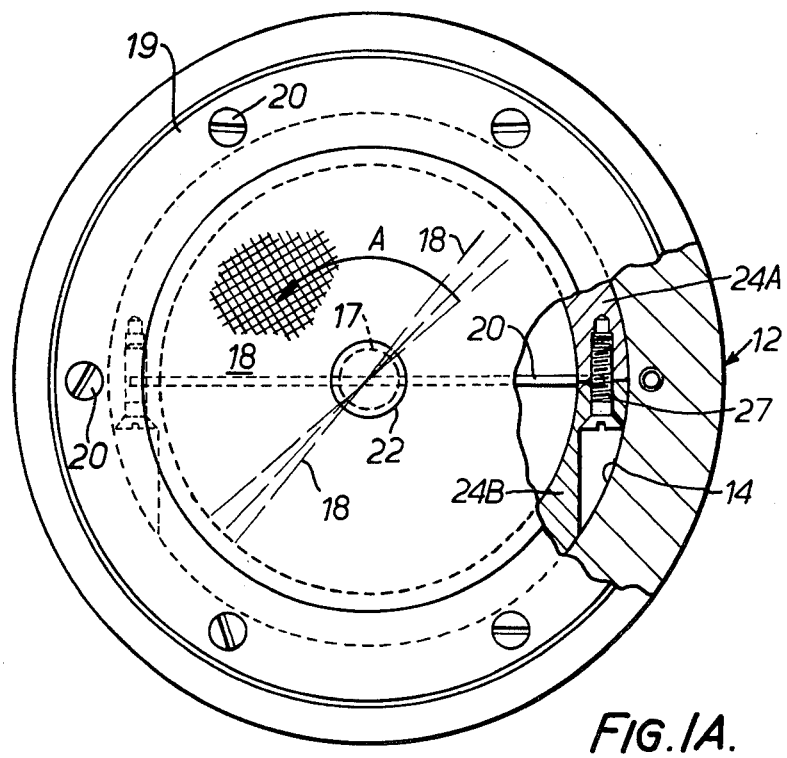
FIG. 1A is a plan view of the piston of FIG. 1.

In the embodiment shown in FIGS. 1 and 1A, a possible form of direct-injection petrol engine has a cylinder block 10 and cylinder head 11 with poppet valves 11A, 11B all of conventional form, and has pistons 12 in the cylinders 13 each of the pistons 12 being provided (as is well-known for pistons of compression-ignition engines) with a cylindrical open-topped recess 14 in the upper side of the piston crown 15, the recess 14 forming the major part of the combustion chamber in the associated cylinder 13 when the piston is in the top-dead-centre position. Whilst in FIG. 1 the recess 14 has a flat bottom, it is possible for the recess to have a central circular-section protrusion, e.g. of generally conical form, projecting upwardly in its bottom to form an annular space between itself and the cylindrical side wall of the recess along which the air/fuel charge will flow around the projection.

The engine has associated with each cylinder 13 a fuel injector 16 mounted in the cylinder head 11 centrally with respect to the recess 14, the tip of the nozzle 17 of each injector 16 protruding downwardly slightly into the upper part of the recess 14 at top-dead-centre as shown in FIG. 1. The injector nozzle 17 is supplied with a metered quantity of gasoline fuel through the associated injector body 16 and a pipe (not shown) leading from an injection pump in a conventional manner. The nozzle 17 has two delivery holes arranged in diametrically-opposite positions in the nozzle tip so as to spray two jets 18 of atomised fuel in radial, downwardly-inclined directions into the recess 14.

Air is induced or blown into the engine cylinder 13 above the piston crown 15 in one of many known ways in such a manner as to set up a rotary motion of the air flow around the cylinder axis in the combustion chamber. This rotary air flow is frequently referred to as air swirl.

Fixed by means of a mounting ring 19 and screws 20 to the piston crown 15 to extend across the top of the recess 14 is a circular disc 21 of wire gauze having a small central hole 22 through which the tip of the injector nozzle 17 projects with clearance at top-dead-centre, as shown in FIG. 1.

Extending diametrically across the recess 14 between the underside of the gauze disc 21 and the bottom of the recess 14, to which its lower edge conforms, is a further sheet 23 of wire gauze which is clamped at opposite ends between the two halves 24A, 24B of a split cylindrical liner 24 which fits closely within the recess 14. The upper edge 25 of the vertical gauze 23 is reinforced against inertia forces by a wire 26.

The liner halves 24A, 24B are secured together by means of circumferentially-extending screws 27. The vertical gauze sheet 23 thus divides the recess 14 within the liner 24 into two semi-cylindrical spaces, into which the two fuel jets 18 are respectively sprayed by the injector nozzle 17 as shown in FIG. 1A. The upper edge 25 of the gauze 23 has a small cutaway 28 to accommodate the tip of the nozzle 17.

Injection of the fuel from the nozzle 17 takes place through the central hole 22 in the top gauze 21 into the recess 14, starting shortly before the top-dead-centre position is reached.

It will be seen from FIG. 1A that the two jets 18 of sprayed fuel are directed into the respective spaces in the recess 14 near the portions of the vertical gauze 23 which are respectively upstream of the jets 18 with respect to the direction of air swirl around the recess indicated by the arrow A (FIG. 1A), so as to allow time for fuel vapourization before the air swirl carries the atomised and vapourised fuel onto the downstream portions of the gauze 23. The air flow of course passes freely through the material of the gauzes 21 and 23.

The gauzes 21 and 23 are made of or coated with a suitable catalyst for combustion. For example the gauzes 21 and 23 may be made of platinum wire, or of a suitable heat-resistant wire which has been coated either with platinum by electroplating, or with a suitable thin wash of a porous heat-resisting ceramic on which the platinum is chemically-deposited in a known manner so as to have a large surface area. Instead of pure platinum, use may be made of some other catalytic material, for example a metal with a specially treated surface, or one of the known combinations with platinum of small quantities of other elements (mostly confined to the same chemical group as platinum) which enhance the catalytic action of pure platinum.

It will be understood that as the fuel, i.e. petrol, is sprayed into the semi-cylindrical spaces within the recess 14 below the top gauze 21 and on either side of the diametrical gauze 23, the atomized fuel will be taken up by the air swirl and carried into contact with one or each of the catalytic gauzes 21 and 23 by which it will be ignited. The whole of the air flow into which the fuel has been injected must pass through at least one of the catalytic gauzes before it can escape from the recess 11 into the adjacent cylinder space, and this ensures multiple-point catalytic oxidation of the whole of the fuel before it can reach the cylinder exhaust port, so that virtually no unburnt hydrocarbons will be present in the exhaust gases.

If the injector nozzle 11 has more than two injection holes, the single diametral gauze 23 will be replaced by a corresponding number of radial gauze sheets. For example, with an injector nozzle having four spray holes delivering radial jets of fuel at 90° spacings, the catalyst-carrying structure will have four radial gauze sheets extending below the top gauze 21 to divide the internal space in the recess 14 into four quadrants, into which the fuel jets 18 are respectively sprayed.

Figure 2A:
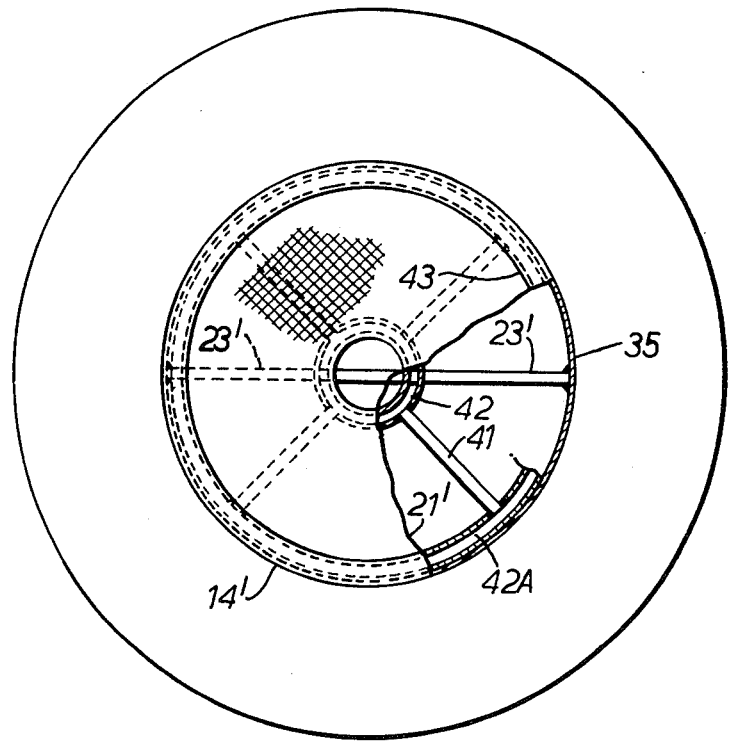
FIGS. 2 and 2A are views similar to FIGS. 1 and 1A of a modified form of piston embodying the invention.
Figure 2:
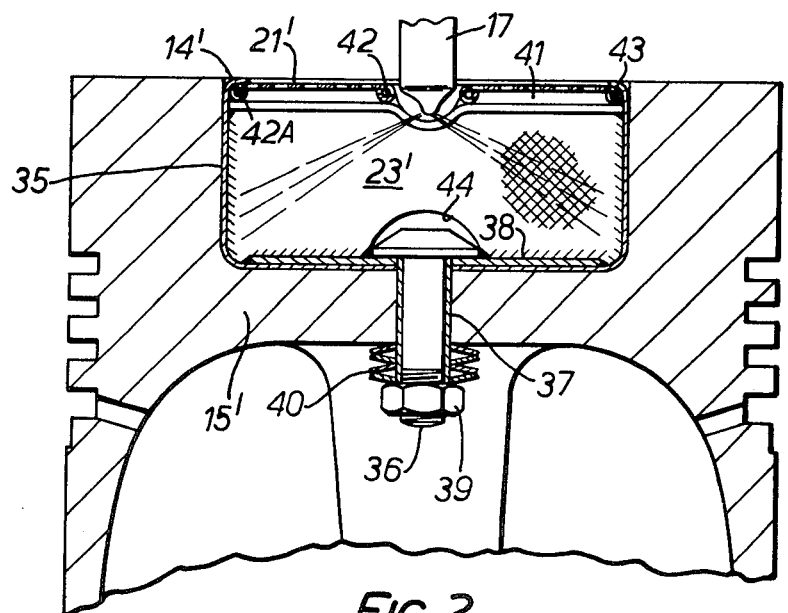

FIGS. 2 and 2A show a modified construction of the piston assembly of FIGS. 1 and 1A, in which the catalyst-carrying structure comprises a pressed or spun sheet metal bowl 35 which is a close fit in the recess 14' and whose bottom wall is clamped to the bottom of the recess by means of a clamping bolt 36 extending through a hole in the piston crown 15', the hole being lined by a sleeve 37. The head of the bolt 36 overlies and is welded to a clamping plate 38 which in turn overlies and is welded to the bottom wall of the bowl 35, so that the whole assembly of bowl 35, clamping plate 38 and bolt 36 forms a unitary structure. A nut 39 threaded onto the bolt 36 below the piston crown bears against the sleeve 37 which acts as a spacer, and a stack of Belleville washers 40 threaded onto the stem of the bolt 36 is interposed between the nut 39 and the under surface of the piston crown 15' to hold the unitary bowl structure firmly to the bottom of the recess 14' in a manner permitting differential thermal expansions of the various components.

The top gauze 21' comprises a disc of wire gauze which is strengthened by a spider 41 with inner and outer wire reinforcing rings 42 and 42A, and is secured as by welding beneath the top lip 43 of the pressed or spun bowl 35. The diametral gauze 23', which has a cutout 44 in its lower edge to clear the head of the bolt 36, is held in position by welds at its edges to the bowl 35 and clamping plate 38. The gauzes 21' and 23' are made of or coated with a catalyst material as before.

Figure 3:
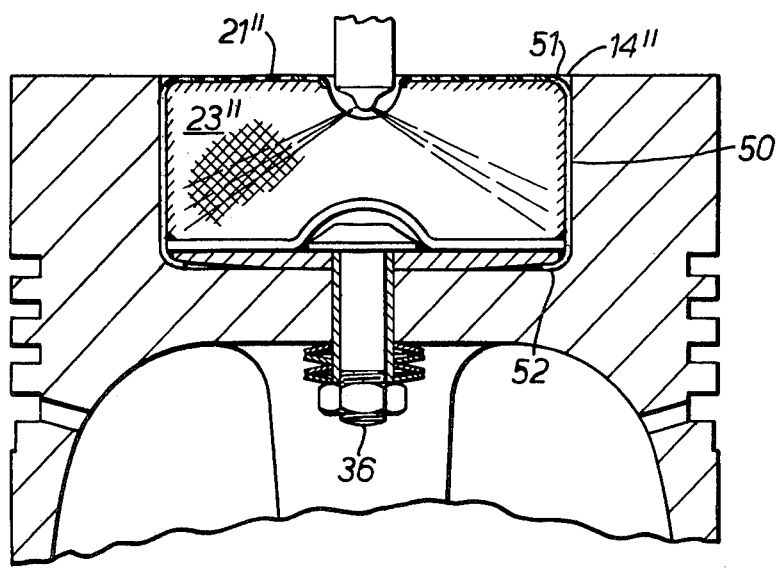
FIG. 3 is a sectional elevation of another modified piston embodying the invention.

FIG. 3 shows another modification in which the catalyst-carrying structure comprises a pressed or spun sleeve 50 with upper and lower inwardly-directed lips 51 and 52. The upper gauze 21" is welded to the upper lip 51 at its circumference, and the lower lip 52 is welded to the circumference of an annular bottom plate 53 held in position by the bolt 36 as in the case of FIG. 2. The diametral gauze 23" is welded at its upper edge to the top gauze 21" and at its opposite ends to the sleeve 50.

The operation of the embodiments of FIGS. 2 and 2A and of FIG. 3 is similar to that of FIGS. 1 and 1A.

It should be pointed out that the practical design considerations involved in the design of adequate inlet and exhaust ports and valve sizes, in conjunction with a generally-central injection position, will usually result in configurations in which the centre of the recess in the piston crown, and the tip of the injection nozzle, are both slightly off the axis of the cylinder bore. The centre of the tip of the nozzle 17 and the central axis of the recess 14 etc., are usually not exactly coincident.

Whilst in the specific embodiments described and illustrated the catalyst comprises or is carried on metal gauze, it is possible to use other arangements in which the whole of the fuel in the air/fuel mixture is passed through or over a widely-distributed catalyst in the combustion chamber before it can reach the exhaust port. For example, instead of gauze it is theoretically possible to use perforated metal sheet coated with catalyst; short pieces of material in matrix form having circular, triangular or other geometrically-shaped passages formed from ceramic, glass or metallic sheet coated with the catalyst; or even sintered porous materials whose surfaces are coated with the catalyst.

What I claim as my invention and desire to secure by Letters Patent is:

1. An internal combustion engine of reciprocating-piston type having a cylinder with a combustion chamber, and a piston with a crown in the cylinder, the major portion of the volume of said combustion chamber being afforded by a recess formed in the crown of the piston, the recess having a bottom, a catalytic element in the cylinder carried by the piston and mounted in a position overlying the bottom of said recess, and means for injecting fuel into said recess, when the piston is at about its top-dead-centre position, in a direction such that substantially the whole of the injected fuel will contact the surface of the catalytic element to initiate its combustion.

2. An internal combustion engine as claimed in claim 1 in which the catalytic element has a structure formed with multiple apertures extending through its thickness, through which apertures the injected fuel mixed with combustion air passes.

3. An internal combustion engine as claimed in claim 2 in which the catalytic element is of grid construction.

4. An internal combustion engine as claimed in claim 2 in which the catalytic element is of matrix construction.

5. An internal combustion engine as claimed in claim 2 in which the catalytic element is of sintered construction.

6. An internal combustion engine as claimed in claim 2 in which the catalytic element extends completely across the open top of the recess, whereby the fuel/air mixture leaving the recess passes outwardly through the catalytic element.

7. An internal combustion engine as claimed in claim 6 in which the catalytic element is formed with an aperture through which the fuel is injected into the interior of the recess by the said means for injection.

8. An internal combustion engine as claimed in claim 7 in which the catalytic element is of basket shape and construction and is mounted in the said recess, with the top wall of the basket extending completely across the open top of the recess.

9. An internal combustion engine as claimed in claim 8 in which the interior of the basket-shaped catalytic element is divided into a plurality of compartments by at least one dividing wall extending transversely to the said top wall and depending therefrom, the dividing wall also being permeable to the flow of combustion gas, and in which the said means for fuel injection is arranged to inject fuel through the said aperture separately into each of said compartments.

10. An internal combustion engine as claimed in claim 9, in which the said recess is cylindrical in form and in which the basket-shaped catalytic element is also cylindrical in form and fits the recess.

11. An internal combustion engine as claimed in claim 10 in which the said dividing wall extends diametrically across the basket-shaped catalytic element.

12. An internal combustion engine as claimed in claim 9 in which there are more than two of the said compartments in the cylindrical catalytic element, separated by radial dividing walls.

13. An internal combustion engine as in claim 2 wherein the catalytic element is of gauze construction.

14. An internal combustion engine as in claim 2 wherein the catalytic element is of mesh construction.

* * * * *